United States Patent
De Brouwer

(10) Patent No.: US 11,542,033 B2
(45) Date of Patent: Jan. 3, 2023

(54) DYNAMIC ILLUMINATION SYSTEM FOR RUNWAY ILLUMINATION

(71) Applicant: Airbus Operations S.L., Getafe (ES)

(72) Inventor: Gabrielle Josephine Christiane De Brouwer, Getafe (ES)

(73) Assignee: Airbus Operations S.L., Getafe (ES)

( * ) Notice: Subject to any disclaimer, the term of this patent is extended or adjusted under 35 U.S.C. 154(b) by 350 days.

(21) Appl. No.: 16/842,173

(22) Filed: Apr. 7, 2020

(65) Prior Publication Data

US 2020/0324912 A1 Oct. 15, 2020

(30) Foreign Application Priority Data

Apr. 10, 2019 (EP) ..................................... 19382266

(51) Int. Cl.
*B64D 47/04* (2006.01)
*H05B 45/44* (2020.01)
(Continued)

(52) U.S. Cl.
CPC .............. *B64D 47/04* (2013.01); *F21V 14/02* (2013.01); *F21V 21/15* (2013.01); *H05B 45/10* (2020.01); *H05B 45/44* (2020.01); *H05B 47/00* (2020.01); *H05B 47/10* (2020.01); *H05B 47/105* (2020.01); *B64D 2203/00* (2013.01)

(58) Field of Classification Search
None
See application file for complete search history.

(56) References Cited

U.S. PATENT DOCUMENTS 9,643,736 B1 * 5/2017 Ell .......................... B64D 47/08
2015/0146442 A1 5/2015 Bonnefous et al.
(Continued)

FOREIGN PATENT DOCUMENTS

EP 2995501 A1 3/2016
EP 3141485 A1 * 3/2017 ............. B60Q 1/085
(Continued)

OTHER PUBLICATIONS

European Search Report; priority document.

*Primary Examiner* — Dedei K Hammond
(74) *Attorney, Agent, or Firm* — Greer, Burns & Crain, Ltd.

(57) ABSTRACT

A dynamic runway illumination system, including a light source having an addressable light beam direction, and a control unit configured to receive aircraft attitude information and the orientation of the runway selected for takeoff or landing, obtain horizontal and vertical axes, the horizontal axis being collinear with the takeoff or landing longitudinal direction, determine the actual and the reference aircraft trajectories, obtain the actual and the reference vertical approach angles, and the actual horizontal approach angle, and actuate onto the light source to perform an angular movement in the light beam direction of an absolute value of the actual vertical approach angle minus the absolute value of the reference vertical approach angle about the vertical axis, and an angular movement of an absolute value of the actual horizontal approach angle about the horizontal axis, to vertically and horizontally align the beam of the light source towards the runway direction.

8 Claims, 4 Drawing Sheets

(51) Int. Cl.
*H05B 47/10* (2020.01)
*F21V 14/02* (2006.01)
*F21V 21/15* (2006.01)
*H05B 47/00* (2020.01)
*H05B 45/10* (2020.01)
*H05B 47/105* (2020.01)

(56) References Cited

U.S. PATENT DOCUMENTS

| | | |
|---|---|---|
| 2016/0076722 A1 | 3/2016 | Hessling von Heimendahl |
| 2017/0073083 A1 | 3/2017 | Hessling-von Heimendahl |
| 2019/0163125 A1 | 5/2019 | Christmas et al. |

FOREIGN PATENT DOCUMENTS

| | | | |
|---|---|---|---|
| EP | 3141485 | A1 | 3/2017 |
| EP | 3168529 | A1 | 5/2017 |

\* cited by examiner

DYNAMIC ILLUMINATION SYSTEM FOR RUNWAY ILLUMINATION

CROSS-REFERENCES TO RELATED APPLICATIONS

This application claims the benefit of the European patent application No. 19382266.5 filed on Apr. 10, 2019, the entire disclosures of which are incorporated herein by way of reference.

FIELD OF THE INVENTION

The present invention refers to a dynamic illumination system for runway illumination. More particularly, the invention is relative to an aircraft illumination system for runway illumination for take-off and landing purposes.

BACKGROUND OF THE INVENTION

Currently, two main solutions exist for the dynamic illumination of a runway, one solution is based in the use of MEMs (Micro-Electro-Mechanical Systems) computation, and another one is based in image recognition. The first solution requires MEMs technology embedded within the light to estimate the relative position and attitude of the aircraft to the runway in order to adapt the illumination accordingly, while the second solution consists of embedding a camera in a light, and recognizing the runway by image post treatment to orient the light beam accordingly.

Both solutions require the integration of complex architectures in a light.

In addition, both of these solutions are not robust to all aircraft attitudes, due to the low reliability of the techniques that are used. In particular, a lot of bias is present on the MEMs technique, and several low visibility issues are experienced due to the weather conditions in the video recognition technique.

Further, lights to illuminate the runway are usually designed for a specific reference scenario of attitude of the aircraft for take-off and landing phase, and this reference orientation of the light beam is not always the best adapted to the actual attitude of the aircraft (given by its velocity vector); an example is landing with cross wind or landing at higher velocity (different pitch approach than the reference scenario).

It would therefore be desirable to provide technical means that are simple, efficient at all aircraft attitudes, and that are capable of withstanding environment conditions without being operationally affected.

SUMMARY OF THE INVENTION

The present invention overcomes the above mentioned drawbacks by providing a dynamic illumination system for runway illumination that solves the above identified limitations of the state of the art.

One object of the invention is to provide an architecture for runway illumination that is more efficient and best adapted to all aircraft attitudes considering its velocity vector.

Another object of the invention is to provide an architecture for runway illumination that improves the illumination performances in any external environmental conditions, also in low visibility scenarios.

The present invention refers to a dynamic illumination system that comprises a light source having an addressable light beam direction, and a control unit configured to:
- receive aircraft attitude information, the runway (R) selected for takeoff or landing, and the runway orientation ($\vec{R}$),
- obtain horizontal ($\vec{x}$) and vertical axes ($\vec{y}$), the horizontal axis ($\vec{x}$) being collinear with the longitudinal direction of the selected runway ($\vec{R}$),
- determine the actual aircraft trajectory ($\vec{V}$) and the reference aircraft trajectory ($\vec{V}o$) in the horizontal and vertical axes ($\vec{x}, \vec{y}$) from the aircraft attitude information,
- obtain the actual vertical approach angle ($\beta$) formed between projection in the X-Y plane of the actual aircraft trajectory ($\vec{V}$) and the horizontal axis ($\vec{x}$), and the reference vertical approach angle ($\beta 0$) formed between the reference aircraft trajectory ($\vec{V}o$) and the horizontal axis ($\vec{x}$),
- obtain the actual horizontal approach angle ($\gamma$) formed between the projection of the aircraft trajectory ($\vec{V}$) in the X-Z plane and the horizontal axis ($\vec{x}$),
- actuate onto the light source to perform an angular movement in the light beam direction ($\vec{L}$) of a value of $|\beta|-|\beta 0|$ about the vertical axis ($\vec{y}$) following the direction defined by the angular movement performed from the actual approach angle ($\beta$) towards the reference approach angle ($\beta 0$), to vertically align the beam of the light source towards the runway direction,
- and, actuate onto the light source to perform an angular movement in the light beam direction ($\vec{L}$) of a value of $|\gamma|$ about the horizontal axis ($\vec{x}$) following the opposite direction defined by the angular movement performed from the actual horizontal approach angle ($\gamma$) towards the horizontal axis ($\vec{x}$) to horizontally align the beam of the light source towards the runway direction.

This way, the invention provides a dynamic illumination system adapted to orient the light beam towards the direction of the runway selected for takeoff or landing considering the aircraft trajectory at any time.

Further, since the light source of the system is connected to aircraft existing data to know the attitude of the aircraft, and to the flight management system data to know, via the QFU code (magnetic orientation compared to north, clockwise), which runway has been selected and how it is oriented, the invention provides an easier and a more reliable way of orienting the light beam towards the current and correct direction of the runway in comparison with the state of the art solutions.

BRIEF DESCRIPTION OF THE DRAWINGS

For a better comprehension of the invention, the following drawings are provided for illustrative and non-limiting purposes, wherein:

FIG. 1*a* shows the vectors in a vertical plane. FIG. 1*b* shows the vectors in a horizontal plane.

DETAILED DESCRIPTION OF THE PREFERRED EMBODIMENTS

According to the invention, the illumination system comprises a light source, and a control unit. The light source has an addressable light beam direction ($\vec{L}$) that, being steerable, provides a dynamic illumination, sensitive to the actual aircraft attitude information, and the orientation of the runway ($\vec{R}$) selected for takeoff or landing.

Figure 1A:
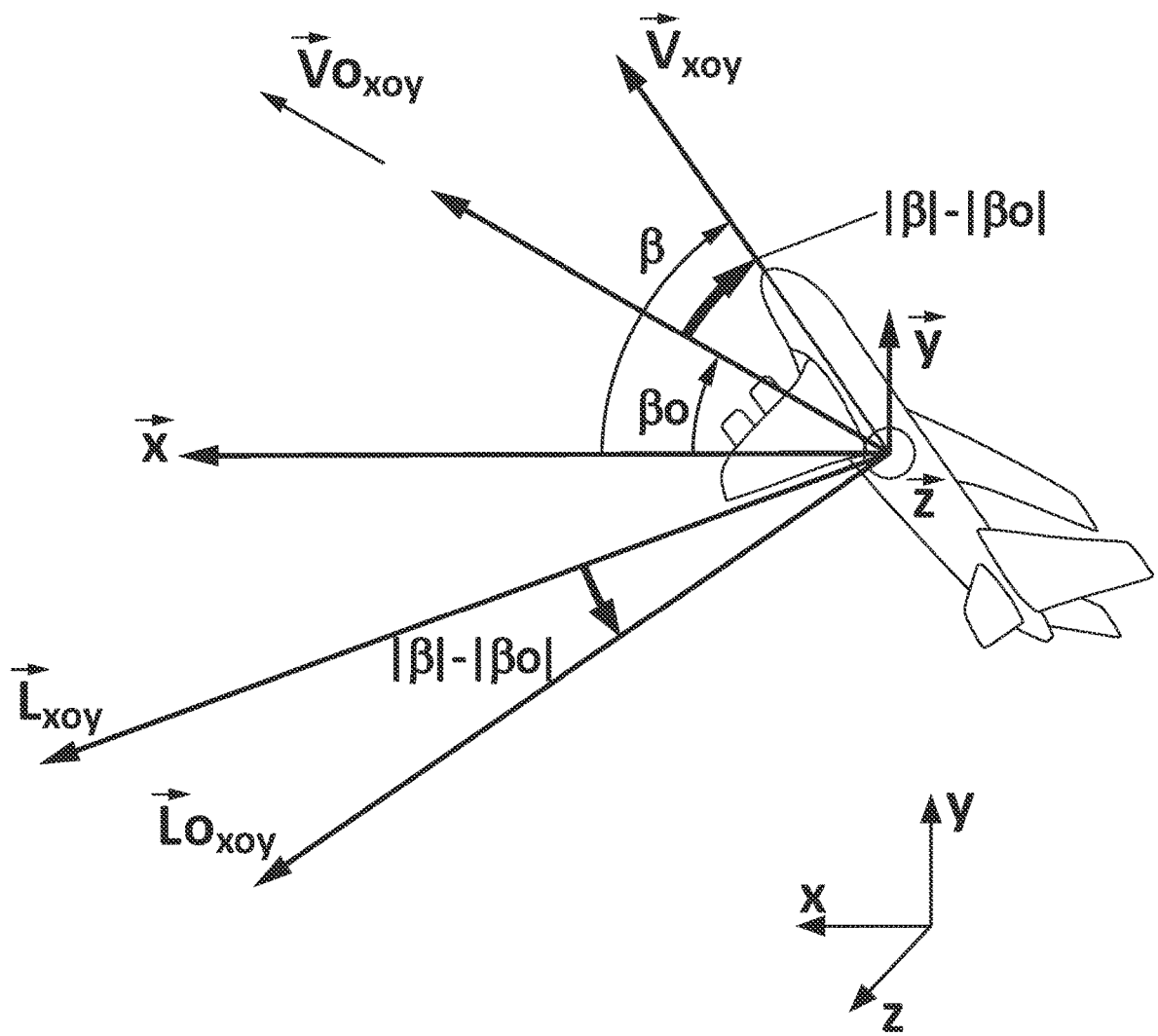
FIGS. 1a and 1b show, in horizontal and vertical planes, the vectors considered in a first scenario where the actual aircraft trajectory ($\vec{V}$) is diverged from the reference aircraft trajectory ($\vec{V}o$) associated with a specific aircraft attitude.
Figure 1B:
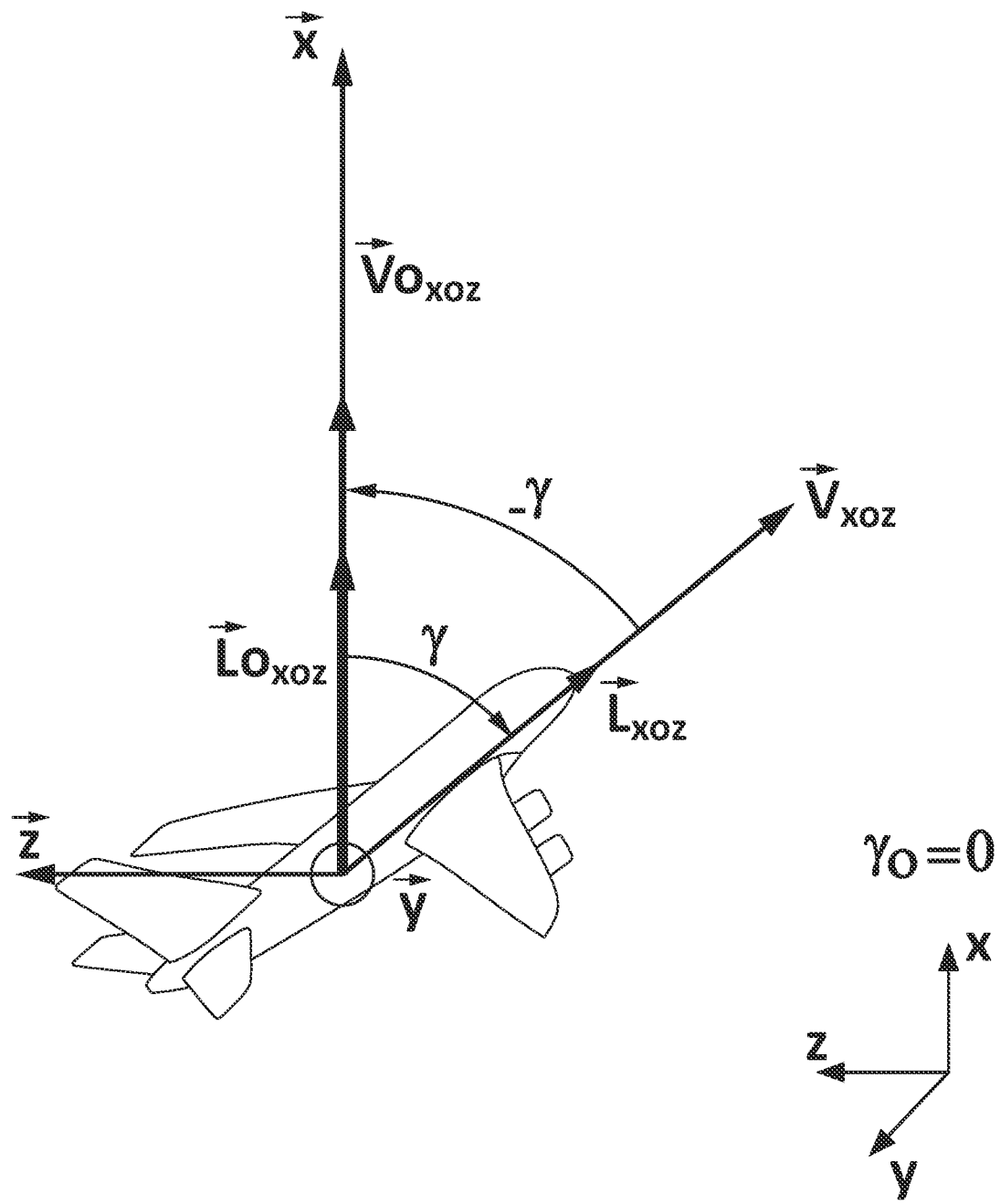

FIGS. 1*a* and 1*b* schematically show a first scenario in which an aircraft follows a trajectory deviated from the reference—desired—trajectory. Consequently, the light beam direction is also deviated from the reference-desired-direction considering the aircraft trajectory.

FIG. 1*a* shows the actual aircraft trajectory ($\vec{V}$), the reference aircraft trajectory ($\vec{Vo}$), the actual light beam direction ($\vec{L}$), and the reference light beam direction ($\vec{Lo}$), wherein the reference light beam direction ($\vec{Lo}$) corresponds to the reference aircraft trajectory ($\vec{Vo}$) in the vertical plane XY. As reference, horizontal axis ($\vec{x}$) is collinear with the longitudinal direction of the selected runway ($\vec{R}$).

As shown, the aircraft following the actual aircraft trajectory ($\vec{V}$) forms an angle β with the horizontal axis $\vec{x}$, while the reference—desired as per light orientation default design-aircraft trajectory ($\vec{Vo}$) forms an angle β0 with the horizontal axis $\vec{x}$. Thus, the actual aircraft trajectory ($\vec{V}$) is deviated |β|-|β0| from the reference—desired—aircraft trajectory ($\vec{Vo}$). Accordingly, the light beam direction ($\vec{L}$) is corrected to achieve the desired light beam direction ($\vec{Lo}$), where this desired light beam direction ($\vec{Lo}$) corresponds to the deviation of a value of |β|-|β0| about the vertical axis ($\vec{y}$), following the direction defined by the angular movement performed from the actual approach angle (β) towards the reference—desired—approach angle (β0) of the light beam direction ($\vec{L}$). This way, the light beam direction is vertically aligned towards the direction of the runway selected for takeoff or landing.

FIG. 1*b* shows the actual aircraft trajectory ($\vec{V}$), the reference aircraft trajectory ($\vec{Vo}$), the actual light beam direction ($\vec{L}$), and the desired light beam direction ($\vec{Lo}$)—corresponding to the reference aircraft trajectory ($\vec{Vo}$)—in the horizontal plane XZ.

As shown, the aircraft following the actual aircraft trajectory ($\vec{V}$) forms an angle γ with the horizontal axis $\vec{y}$, while the reference—desired as per light beam default orientation—aircraft trajectory ($\vec{Vo}$) forms an angle γ0 with the horizontal axis $\vec{y}$. Thus, the actual aircraft trajectory ($\vec{V}$) is deviated |γ|-|γ0| from the reference—desired—aircraft trajectory ($\vec{Vo}$). Accordingly, the light beam direction ($\vec{L}$) is corrected to achieve the desired light beam direction ($\vec{Lo}$), where this desired light beam direction ($\vec{Lo}$) corresponds to the deviation of a value of |γ| about the horizontal axis ($\vec{x}$), following the opposite direction defined by the angular movement performed from the actual horizontal approach angle (γ) towards the horizontal axis ($\vec{x}$). This way, the light beam direction is horizontally aligned towards the direction of the runway selected for takeoff or landing.

According to a preferred embodiment, the light source is mechanically movable, and is configured to move according to a received servo command.

According to another preferred embodiment, the light source has an orientable output beam consisting of an electronically controlled matrix of LEDs (with not mechanically movable parts). Alternatively, the light source may consist of an electronically controlled matrix of laser diodes, or a projection via LCD, or a micro mirror electronically controlled.

Also, according to another preferred embodiment, the control unit is connected to the flight management system data of the aircraft, to determine the runway (R) selected for takeoff or landing, and/or its orientation ($\vec{R}$).

According to another preferred embodiment, the control unit is configured to automatically turn on the light source in approach, landing and take-off phases based on the information received from the flight management system, in particular, from altitude and distance to target runway information.

According to another preferred embodiment, the control unit is further configured to perform auto-dimming functions to avoid glaring another aircrafts in the airport after the landing has been performed, or before the acceleration phase of the take-off. These phases are detected by the information provided by the flight management system.

Figure 2:
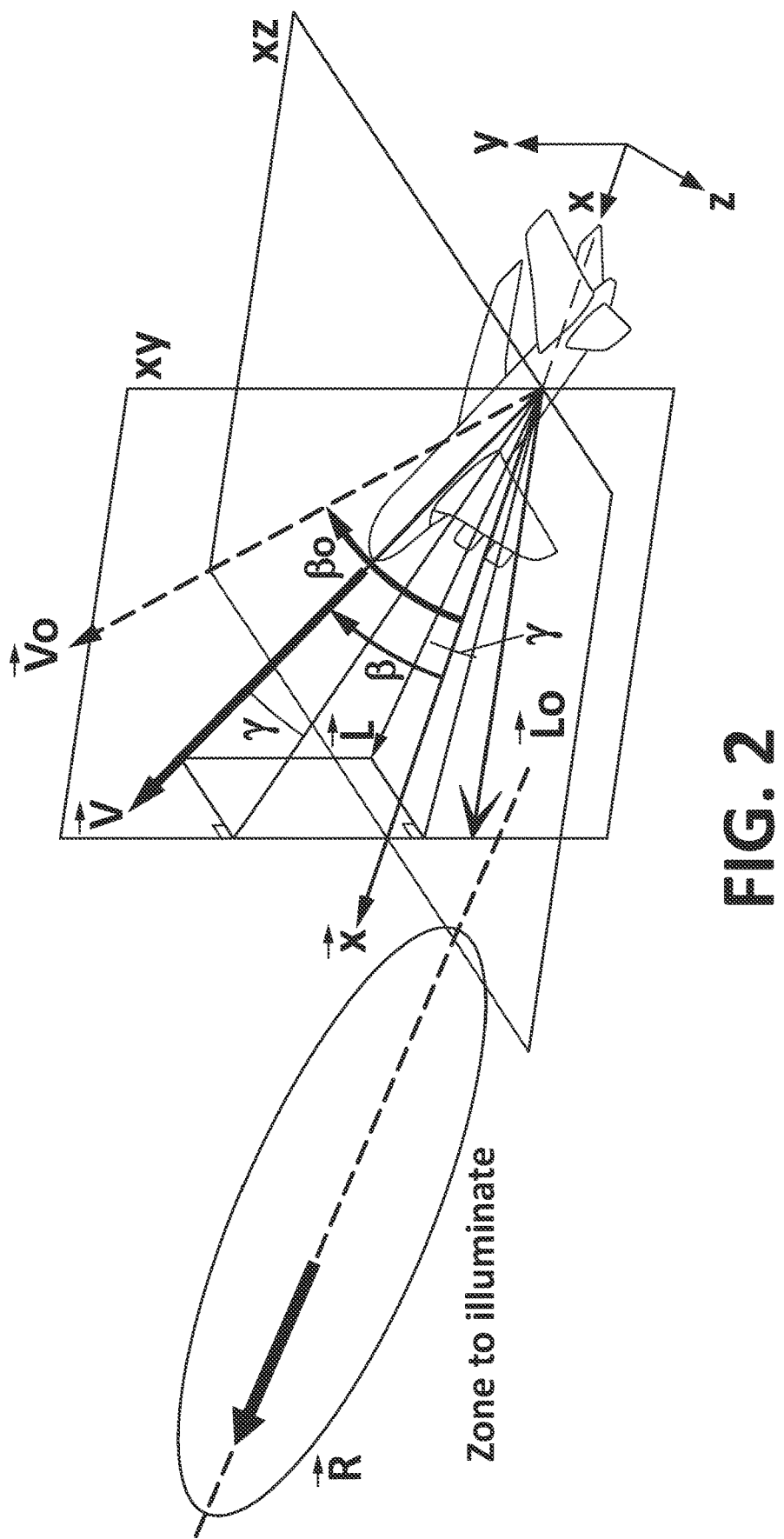
FIG. 2 shows altogether the vectors considered in a second scenario where the actual aircraft trajectory ($\vec{V}$) is diverged from the reference aircraft trajectory ($\vec{Vo}$) associated with a specific aircraft attitude.

FIG. 2 shows a second scenario where the aircraft is not oriented to be aligned with the direction of the runway selected for takeoff or landing ($\vec{R}$), and for that, in which the light flux ($\vec{L}$) needs to be corrected by β (along the pitch axis) and γ (along the yaw axis) with respect to the desired light beam direction ($\vec{Lo}$), considering the relative position of the aircraft towards the runway orientation.

As mentioned, to obtain the desired light beam direction ($\vec{Lo}$) starts with ($\vec{L}$), which is the basic direction of the light flux defined in the aircraft (the one that exists today—and the right direction when the aircraft is oriented in the direction of the runway selected for takeoff or landing—), and is then corrected with the aircraft attitude, so that, if the aircraft trajectory (speed vector, ($\vec{V}$) is tilted upwards such that an angle γ is formed compared to the horizontal plan defined by the runway, the vector $\vec{L}$ is corrected by to keep the focus down; (and inversely to keep the focus up if it is tilted downwards), and if the aircraft trajectory (speed vector, ($\vec{V}$) is laterally moved such that an angle γ is formed compared to a vertical plan perpendicular to the wings and to the fuselage reference line, the vector $\vec{L}$ is corrected by at +/−|γ to focus the light accordingly.

Figure 3:
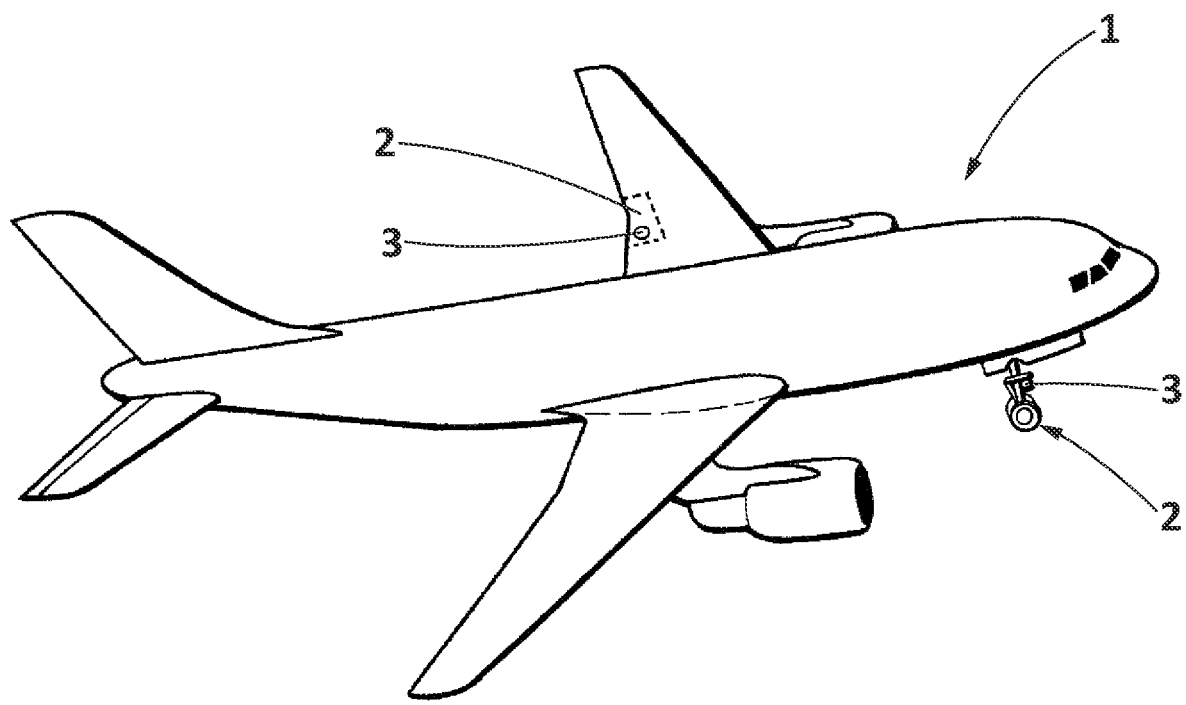
FIG. 3 shows an aircraft having the dynamic illumination system embedded in one of its parts.

FIG. 3 shows an aircraft (1) having parts (2) in which a dynamic illumination system (3) for runway illumination as described above may be embedded. The dynamic illumination system (3) may be embedded on a movable or not movable part (2) of the aircraft (1).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A dynamic illumination system for runway illumination in an aircraft, comprising:
    a light source having steerable light beam direction,
    a control unit configured to:
        receive, from an aircraft data system, aircraft attitude information, a runway selected for takeoff or landing, and an orientation of a runway orientation,
        obtain horizontal and vertical axes, the horizontal axis being collinear with a longitudinal direction of the selected runway,
        determine, from the received aircraft attitude information, an actual aircraft trajectory and a reference aircraft trajectory in horizontal and vertical axes,
        obtain an actual vertical approach angle formed between a projection in an X-Y plane of the actual aircraft trajectory and the horizontal axis, and a reference vertical approach angle formed between the reference aircraft trajectory and the horizontal axis,
        obtain an actual horizontal approach angle formed between a projection of the aircraft trajectory in an X-Z plane and the horizontal axis,
        actuate the light source to perform an angular movement in the light beam direction of an absolute value of the actual vertical approach angle minus an absolute value of the reference vertical approach angle about the vertical axis following a direction defined by an angular movement performed from the actual vertical approach angle towards the reference vertical approach angle, to vertically align the beam of the light source towards the runway direction, and
        actuate the light source to perform an angular movement in the light beam direction of an absolute value of the actual horizontal approach angle about the horizontal axis following an opposite direction defined by an angular movement performed from the actual horizontal approach angle towards the horizontal axis, to horizontally align an output beam of the light source towards the runway direction.

2. The dynamic illumination system for runway illumination, according to claim 1, wherein the light source is mechanically movable, and is configured to move according to a received servo command.

3. The dynamic illumination system for runway illumination, according to claim 1, wherein the light source has an orientable output beam.

4. The dynamic illumination system for runway illumination, according to claim 1, wherein the output beam comprises an electronically controlled matrix of LEDs or laser diodes, a projection via LCD, or an electronically controlled micro mirror.

5. The dynamic illumination system for runway illumination, according to claim 1, wherein the control unit is connected to flight management system data of the aircraft, to determine at least one of the runway selected for takeoff or landing, or its orientation.

6. The dynamic illumination system for runway illumination, according to claim 5, wherein the control unit is configured to automatically turn on the light source in approach, landing and take-off phases based on the information received from the flight management system.

7. The dynamic illumination system for runway illumination, according to claim 5, wherein the control unit is further configured to perform auto-dimming functions to avoid glaring another aircraft in an airport.

8. An aircraft part comprising the dynamic illumination system for runway illumination according to claim 1, said dynamic illumination system being embedded in the aircraft part.

* * * * *